United States Patent
Zomet et al.

(10) Patent No.: US 10,482,551 B2
(45) Date of Patent: Nov. 19, 2019

(54) SYSTEMS AND METHODS OF AUTOMATICALLY ESTIMATING RESTAURANT WAIT TIMES USING WEARABLE DEVICES

(71) Applicant: Google Inc., Mountain View, CA (US)

(72) Inventors: Asaf Zomet, Jerusalem (IL); Dvir Keysar, Herzliya (IL)

(73) Assignee: Google LLC, Mountain View, CA (US)

( * ) Notice: Subject to any disclaimer, the term of this patent is extended or adjusted under 35 U.S.C. 154(b) by 605 days.

(21) Appl. No.: 14/822,318

(22) Filed: Aug. 10, 2015

(65) Prior Publication Data
US 2017/0046800 A1    Feb. 16, 2017

(51) Int. Cl.
*G06Q 50/12* (2012.01)
*G06Q 10/06* (2012.01)

(52) U.S. Cl.
CPC ......... *G06Q 50/12* (2013.01); *G06Q 10/0631* (2013.01)

(58) Field of Classification Search
USPC ....................................................... 705/7.12
See application file for complete search history.

(56) References Cited

U.S. PATENT DOCUMENTS

| | | | | |
|---|---|---|---|---|
| 2004/0260513 A1* | 12/2004 | Fitzpatrick | ............. | G06Q 10/06 702/182 |
| 2008/0097950 A1* | 4/2008 | Kobayashi | ............. | G06Q 30/02 706/52 |

(Continued)

FOREIGN PATENT DOCUMENTS

| CN | 101828198 A | 9/2010 |
|---|---|---|
| CN | 103150803 A | 6/2013 |

(Continued)

OTHER PUBLICATIONS

Curin et al. (Reducing Service Time at a Busy Fast Food Restaurant on Campus, WSC '05 Proceedings of the 37th conference on Winter simulation, University of Michigan, pp. 2628-2635, Dec. 4-7, 2005).*

(Continued)

*Primary Examiner* — Johnna R Loftis
*Assistant Examiner* — Matthew D Henry
(74) *Attorney, Agent, or Firm* — Dority & Manning, P.A.

(57) ABSTRACT

Computer-implemented methods and systems of estimating wait times and food serving times at a restaurant using wearable devices include identifying from portions of sensor data that a user is seated at a restaurant table at an estimated sitting time. In addition, portions of sensor data can be used to identify that a user has started eating at a given restaurant. Time-correlated location data can be used to determine an estimated arrival time of the user at a current location. An estimated wait time can be determined from the difference between the estimated sitting time and the estimated arrival time. An estimated food serving time can be determined from the difference between estimated eating time and arrival time or eating time and sitting time. Data indicative of the estimated times can be communicated to other computing devices, evaluated across multiple users, and/or used to develop relevant notifications for surfacing to other users.

19 Claims, 9 Drawing Sheets

(56) References Cited

U.S. PATENT DOCUMENTS

| | | | |
|---|---|---|---|
| 2014/0114807 A1* | 4/2014 | Baker | G06Q 30/016 705/26.41 |
| 2014/0122040 A1 | 5/2014 | Marti | |
| 2014/0163934 A1* | 6/2014 | Zhang | G06Q 10/06 703/2 |
| 2014/0377724 A1* | 12/2014 | Hoover | G06K 9/00355 434/127 |
| 2015/0148624 A1 | 5/2015 | Benaron | |
| 2015/0228062 A1* | 8/2015 | Joshi | G06Q 50/12 382/110 |
| 2016/0066776 A1* | 3/2016 | Weiss | A61B 1/24 433/27 |
| 2016/0157754 A1* | 6/2016 | Shinozuka | A61B 5/1115 340/573.7 |

FOREIGN PATENT DOCUMENTS

| | | |
|---|---|---|
| CN | 103985186 A | 8/2014 |
| CN | 104252347 A | 12/2014 |
| WO | WO 2016/176506 | 11/2016 |

OTHER PUBLICATIONS

Bulut et al., "LineKing: Crowdsourced Line Wait-Time Estimation Using Smartphones", $4^{th}$ International Conference on Mobile Computing, Applications and Services, vol. 110 of the series Lecture Notes of the Institute for Computer Sciences, Social Informatics and Telecommunications Engineering, Seattle, Washington, Oct. 11-12, 2012, pp. 205-224.

Takehara et al., "Analysis of Customer Commtmication by Employee in Restaurant and Lead Time Estimation", Asia-Pacific Signal and Information Processing Association, Angkor Wat, Cambodia, Dec. 9-12, 2014, pp. 9-12.

International Search Report and Written Opinion for PCT/US2016/045148 dated Dec. 23, 2016, 11 pages.

Supplementary European Search Report for EP 16835633 dated Jul. 20, 2018, 9 pages.

Office Action and Search Report for Application No. CN201680024243.6, dated Jun. 5, 2019, 14 pages.

* cited by examiner

SYSTEMS AND METHODS OF AUTOMATICALLY ESTIMATING RESTAURANT WAIT TIMES USING WEARABLE DEVICES

FIELD

The present disclosure relates generally to estimating restaurant wait times, and more particularly to using sensor data from mobile computing devices to automatically estimate restaurant wait times.

BACKGROUND

One of the key factors considered by patrons in selecting a restaurant is the current wait time, (e.g., the expected amount of time a person or group of people will have to wait until they are seated at a restaurant). Wait time determinations can be variously important over a range of occasions for visiting a restaurant, (e.g., typical breakfast, lunch, dinner, snack, coffee, and/or meeting times or other specific times or occasions). Conventional access to wait time information can be limited to in-person information obtained from a restaurant employee when a potential patron physically visits a restaurant or phone-relayed information when a potential patron calls a restaurant and speaks with a restaurant employee via the telephone. Conventional options for identifying expected serving time information can include similar in-person inquiries of a waiter/waitress or analysis of historical information provided online, e.g., on a restaurant review website.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of estimating restaurant wait time. The method can include identifying, by one or more computing devices, from at least one or more portions of sensor data from one or more mobile devices operated by a user that the user is seated at a restaurant table at an estimated sitting time. The method can also include identifying, by the one or more computing devices, from at least time-correlated location data from the one or more mobile devices operated by the user an estimated arrival time of the user at a current location. The method can further include determining, by the one or more computing devices, an estimated wait time by analyzing the difference between the estimated sitting time and the estimated arrival time. The method can still further include communicating, by the one or more computing devices, data indicative of the estimated wait time for the user at the current location to another computing device.

Another example aspect of the present disclosure is directed to a computer-implemented method of estimating restaurant food serving time. The method can include identifying, by one or more computing devices, from one or more additional portions of sensor data from one or more mobile devices operated by a user that the user has started eating at an estimated eating time. The method can also include identifying, by the one or more computing devices, one or more of an estimated arrival time of the user at the restaurant or an estimated sitting time of the user at the restaurant. The method can further include determining, by the one or more computing devices, an estimated food serving time by analyzing the difference between one or more of the estimated sitting time and the estimated eating time or the estimated arrival time and the estimated eating time. The method can still further include communicating, by the one or more computing devices, data indicative of the estimated food serving time at the current location for the user to another computing device.

Other example aspects of the present disclosure are directed to systems, apparatus, tangible, non-transitory computer-readable media, user interfaces, memory devices, and electronic devices for estimating restaurant wait times and/or food serving times using mobile computing devices.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
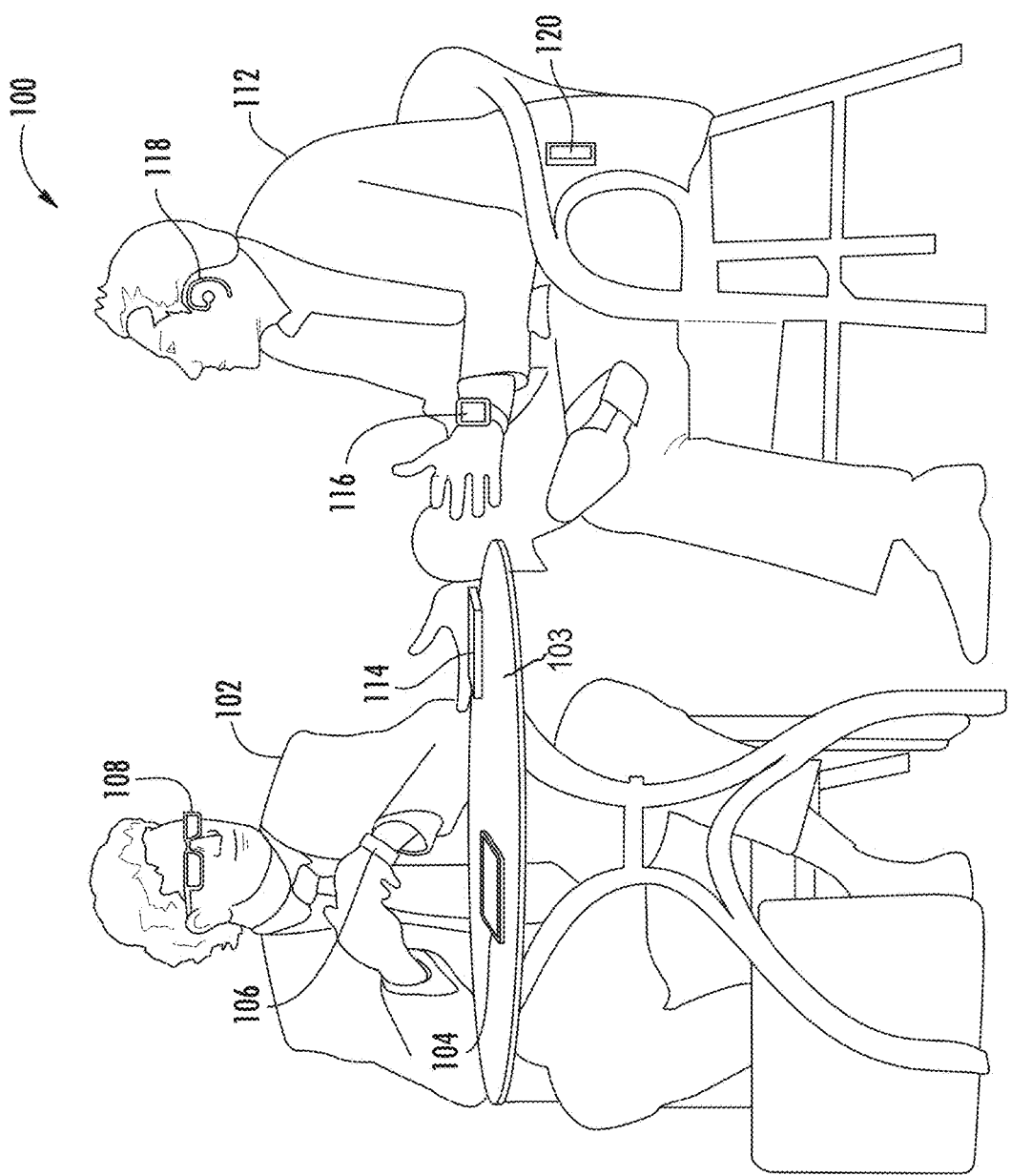
FIG. 1 provides an example overview of mobile devices, including wearable mobile devices, that can be employed by a user as part of determining restaurant wait time and/or food serving time according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In some embodiments, in order to obtain the benefits of the techniques described herein, the user may be required to allow the collection and analysis of sensor data, location data, and other relevant information collected by wearable and/or non-wearable computing devices. For example, in some embodiments, users may be provided with an opportunity to control whether programs or features collect such data or information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable data or other information is removed.

Example aspects of the present disclosure are directed to systems and methods for automatically estimating current wait times for a restaurant. One of the key factors considered by patrons in selecting a restaurant is the current wait time, (e.g., the expected amount of time a person or group of people will have to wait until they are seated at a restaurant). Wait time determinations can be variously important over a range of occasions for visiting a restaurant, (e.g., typical breakfast, lunch, dinner, snack, coffee, and/or meeting times or other specific times or occasions). Conventional access to wait time information can be limited to in-person information obtained from a restaurant employee when a potential patron physically visits a restaurant or phone-relayed information when a potential patron calls a restaurant and speaks with a restaurant employee via the telephone.

The example embodiments according to aspects of the present disclosure can automatically estimate restaurant wait times in real time, without requiring active involvement of restaurant patrons. Relevant sensor data can be collected from current restaurant patrons that help identify and determine specific occurrences such as the estimated sitting time and estimated eating time for that patron. Sensor data can come from various mobile computing devices, including wearable computing devices (e.g., smart watches, wrist-mounted activity trackers, optical head-mounted displays, ear-mounted devices, blood sugar monitors, etc.) and/or other devices (e.g., smartphones, tablets, laptops, personal digital assistants (PDAs), etc.).

Sensor data associated with a particular user can come in a variety of relevant forms for assisting with identification that the particular user has been seated. One example of relevant sensor data can include motion data and/or orientation data from a mobile device that can be used to identify that the mobile device is in a horizontal position for a threshold period of time. This can be a meaningful indicator of a patron placing his/her phone on a restaurant table upon being seated. Another example of relevant sensor data can include motion data and/or orientation data from a wrist-mounted wearable device that can be used to detect the occurrence of specific motion patterns indicative of a user sitting at a table (e.g., placing hands on the table, a reduced amount of hand motion, a user drinking, etc.). Still further examples of relevant sensor data include audio data that can help detect the occurrence of specific sound patterns (e.g., utensils being placed on a table, glasses clinking, user swallowing, etc.) and/or image data that can help detect the occurrence of specific image patterns (e.g., identification of items such as table, dinner/serving ware and/or meal guests, etc.). Time data can also be used to help evaluate the likelihood of certain occurrences happening at a particular restaurant or for a particular user relative to typical windows of time for breakfast, lunch, dinner, coffee, snacks, etc. at the particular restaurant.

Integrated portions of sensor data obtained from one or more devices operated by a user can help identify when a user is sitting at a table (e.g., the estimated sitting time). In some embodiments, machine learning can be used to evaluate obtained sensor data and develop a classifier that correlates predetermined sensor data to specific occurrences that trigger identification of a user being seated at a restaurant table. For example, time-correlated sensor data can become a feature for a training classifier using a learning algorithm such as Neural Network, Support Vector Machine (SVM) or other machine learning process. Classifiers can be trained to evaluate when a person is seated at a restaurant table. Then, in real time, the classifier runs on a user's mobile device and identifies subsequent instances of a user being seated at a restaurant.

A similar process for determining an estimated sitting time can be used to determine an estimated eating time. For example, additional portions of sensor data can help identify hand motion patterns (e.g., a user bringing food to his mouth), cheek bone/muscle movement indicative of chewing, audio and/or image patterns consistent within identification of food and/or eating, increasing blood sugar levels, etc. Select combinations of these additional portions of sensor data can also be used to train classifiers and determine subsequent instances of food being served at a restaurant (i.e., the estimated eating time.)

Another parameter that can be identified in accordance with aspects of the present disclosure can include restaurant arrival time. Arrival time can be determined from location data available via one or more mobile devices used by a restaurant patron. In some instances, the detection of an event such as a patron sitting at a restaurant table, being served food, or eating food at a restaurant can serve as a trigger to determine an estimated arrival time for the user at his/her current location. Location sensors provided via GPS, cell phone triangulation, wireless network identification, Bluetooth low energy (BLE) beacons or other location determination technology can be tracked over a time series to determine how long a user has been in a current location and deduce an estimated arrival time from the time-correlated location data.

Once an estimated arrival time, estimated sitting time, and estimated eating time have been identified, several different wait times can be determined. A first wait time can correspond to the amount of time between a user arriving at a restaurant until the user is seated at a table. A second wait time can correspond to the amount of time between a user being seated at a restaurant table and the user being served his food. A third wait time can correspond to the total amount of time between a user arriving at a restaurant and the user being served his food.

Determined wait times then can be communicated to other computing devices for additional statistical processing. For example, a remote computing device can gather restaurant wait times from multiple users at a particular restaurant and evaluate statistics of the wait times over a period of time (e.g., 10 minutes) by combining wait times for the different users. Example statistics can include but are not limited to a mean wait time, median wait time, variance in wait time, expected value of the wait time, and confidence interval of the wait time.

Estimated wait time and/or food serving time information can be surfaced in a variety of different ways to the current, future, and/or potential patrons of a restaurant. For example, some information might include the current wait time at a particular restaurant, while other information might indicate the typical wait time at a particular restaurant at a given time (e.g., 7:00 pm). Other information can be relayed in the form of alerts, such as a notification sent to interested users indicating when the estimated wait time at a given restaurant is below a particular threshold level (e.g., pop up when the wait time is below 15 minutes.)

According to an example embodiment, a mobile device can include a wait time estimation application running on the mobile device. Provided a user agrees to the collection of data related to attributes such as location, arrival time, wait time, other times, collection and/or analysis of images, motion patterns and/or other sensor data, relevant data can be obtained. Relevant sensor data can be obtained from the mobile device running the application or from other wearable computing devices. Relevant sensor data can be used to track the occurrence of specific patterns of integrated data including motion data, orientation data, sound data, image data, time data or other relevant information. The gathered information can be analyzed in real-time to detect the occurrence of events, including the occurrence of a restaurant patron being seated at a table. This occurrence then can be used to identify an estimated sitting time. Estimated arrival time can be determined from time-correlated location data gathered via the mobile device. An estimated wait time can then be determined from the time difference between estimated arrival and sitting times. Additional wait times can be estimated relative to a food serving time upon detection using additional portions of sensor data that a user has started eating. Estimated wait times can then be relayed to a central location, where wait times can be combined and further analyzed across multiple users at a given restaurant during a period of time. Statistical results of the determined wait time estimates can be shared with other application users, including current, future and/or potential restaurant patrons.

Referring now to FIGS. 1-12, various specific aspects of example systems and methods for automatically estimating restaurant wait times are depicted. With more particular reference to FIG. 1, one or more mobile device users 102, 112 are patrons in a restaurant environment 100. Users 102, 112 have both been seated at table 103. Although only two users 102, 112 are depicted in FIG. 1, it should be appreciated that the present disclosure can be implemented with any number of patrons visiting a restaurant or other environment serving consumables. In addition, multiple groups of one or more patrons meeting together at different tables can be separately identified and used for combined statistical analysis of average wait times within a restaurant.

Although example embodiments refer to data and determined wait times relative to a restaurant, it should be appreciated that the present disclosure equally applies to other establishments within the food service industry, including but not limited to snack shops, bars, bakeries, coffee shops, ice cream shops, catered feeding locations, markets, grocery stores, convenience stores, special event food stands, food carts, mobile vendors, farmer's markets, schools, hotels, boarding establishments, vending locations, or any other establishment that stores, prepares, packages, serves, vends and/or otherwise provides food and/or drinks for human consumption.

Sensor data available from one or more mobile devices operated by users 102, 112 can be used to detect specific events within the restaurant that are relevant to determining wait times. For example, sensor data from computing devices operated by users 102, 112 can be used to determine such specific events as an estimated sitting time (e.g., the time at which users 102, 112 were seated at table 103) and/or an estimated eating time (e.g., the time at which users 102, 112 were served their food or other ordered items). The estimated sitting time and/or estimated eating time can be combined with location data and/or other electronic data to automatically determine and communicate wait times and/or food serving times for particular restaurant locations to other computing devices.

Referring still to FIG. 1, the various computing devices employed by users 102, 112 can include one or more mobile computing devices, such as smartphones 104, 114. Other mobile computing devices can include a tablet computer, a mobile phone, a personal digital assistant (PDA), a laptop computer, a gaming system, a media player, an e-book reader, a television platform, an automobile navigation system, a camera or the like. Smartphones 104, 114 or other mobile computing devices operated by users 102, 112 can include instructions capable of execution by the mobile computing device to perform operations such as identifying specific activity occurrences (e.g., sitting, eating). Smartphones 104, 114 can also serve as a data gathering hub for collecting sensor information from other wearable devices or mobile computing devices operated by users 102, 112.

Mobile computing devices for gathering sensor data in accordance with example embodiments can also include wearable computing devices. For example, user 102 is depicted as operating a wrist-mounted activity tracker 106, while user 112 is depicted as operating a smart watch 116. Both wrist-mounted devices 106, 116 are configured for operable positioning around the wrist of a user and for analyzing sensor data including motion and/or orientation data associated with the user. User 102 also is depicted as operating an optical head-mounted display device 108, which can correspond more particularly to a wearable device such as computerized eyewear or computerized headwear capable of obtaining portions of sensor data relevant to wait time and/or food serving time determinations. User 112 is also depicted as operating a head-mounted or ear-mounted device 118, which can correspond to an ear-mounted Bluetooth device, such as one used for hands-free audio connection to smartphone 114 belonging to user 112. Ear-mounted device 118 can also include motion and/or orientation sensors configured to detect such occurrences as movement in a user's cheekbone or cheek muscles, being potentially indicative of eating by user 112. A still further wearable device operated by user 112 can include a blood sugar monitor (or glucometer) 120 that includes one or more sensors for identifying current blood sugar or glucose levels in a user's bloodstream. Additional and/or alternative wearable devices also can be used in the example embodiments.

In a particular implementation of the sensors shown in the example of FIG. 1, the wrist-mounted devices 106, 116 can include sensors that can analyze motion and/or orientation of the wrists/hands of users 102, 112 to detect specific motion patterns indicative of the users 102, 112 sitting at a table. One example of a relevant motion pattern corresponds to a user placing his hands on the table, since that motion might not do be done while users 102, 112 stand and wait for a table or sit in a restaurant at a location other than their table. Another example of a relevant motion pattern for indicating that a user has been seated corresponds to a user having a reduced amount of hand motion. Many users move their hands more when standing than when they are seated at a table. Yet another example of a relevant motion pattern for indicating that a user is seated can be movement of a user's hand/wrist from the table to his mouth, potentially indicating that a user is drinking water or another beverage upon being seated. Additional and repeated instances of a user moving his hands/wrists from the table to his mouth can be used to help detect and identify the estimated eating time for a user.

In other particular implementations of the sensors shown in the example of FIG. 1, optical head-mounted display 108 can include one or more sensors such as image sensors, motion detection sensors, and audio sensors. Image sensors provided within optical head-mounted display 108 can be used to detect specific items in front of user 102 that help indicate that a user is sitting at a table. Such image-based items for potential detection include table 103, a guest sitting opposite user 102 (e.g., patron 112), dinner/serving ware such as plates, glasses, and/or utensils sitting on table 103, and the like. Other captured or detected images including those showing food or the hands of user 102 bringing food towards his face/mouth can be analyzed to help identify the estimated eating time for user 102. Motion detection sensors within optical head-mounted display 108 can help identify the motion of drinks towards a user's face or mouth, which can be potentially indicative of a user drinking near an estimated sitting time. Additionally or alternatively, motion detection sensors within optical head-mounted display 108 can help identify the motion of food towards a user's face or mouth, which can be potentially indicative of a user eating near an estimated eating time. Audio sensors provided within optical head-mounted display 108 can help detect the occurrence of specific sound patterns (e.g., utensils being placed on a table, glasses clinking, user swallowing, etc.).

Optical head-mounted display 108 or other devices including audio and/or image sensors can also detect audio and/or image patterns that help identify whether a user is indoors or outside. In one example, identifying typical outdoor elements such as but not limited to cars, sky, and the like can be indicative of a user still waiting for a table, where the waiting is more likely done outdoors than inside. If a particular restaurant has outdoor seating on a regular or seasonal basis, additional training data can be identified to help account for such information and make appropriate determinations from gathered audio/image data of a user's surrounding environment.

Still further implementations of the sensors shown in the example of FIG. 1 include the use of sensors within ear-mounted device 118 and/or glucometer 120. Ear-mounted device 118 can include audio sensors and/or motion sensors. Audio sensors within ear-mounted device 118 can help detect specific sound patterns (e.g., utensils being placed on a table, glasses clinking, user swallowing, etc.), while motion sensors can help detect throat motion of user 112 that can be potentially indicative of swallowing and/or cheek-bone motion and/or cheek muscle movement potentially indicative of chewing by user 112. Glucometer 120 can include one or more sensors that are capable of indicating the amount of sugar or glucose in a user's blood stream. In some examples, glucometer 120 can include a stand-alone glucose sensor operated manually or automatically on a periodic basis when user 120 provides a blood sample. In other examples, glucometer 120 can be part of an insulin pump or other device capable of conducting continual blood sugar monitoring of user 112 and delivering insulin to the user's bloodstream when needed. Detected increases in a user's blood sugar levels by glucometer 120 can be another event that potentially indicates a user has started drinking and/or eating items within restaurant 100.

In still further examples, users 102, 112 in FIG. 1 can use sensors within their mobile devices 104, 114 to detect similar events as described above or additional events. For example, many mobile devices including smartphones and the like include audio sensors, image sensors, orientation sensors and motion sensors that can be used to detect various motion patterns, sound patterns and/or image patterns that are potentially indicative of the estimated sitting time and/or estimated eating time for users 102, 112. As such, some example embodiments can be implemented by using just the mobile devices 104, 114. In other example embodiments, different numbers or combinations of mobile computing devices (e.g., just a single wearable device or many wearable devices) alone or in combination with a mobile device such as 104, 114 can be used to obtain relevant sensor data. It should be appreciated that different combinations of mobile computing devices, including wearable and non-wearable devices, can be used in different combinations to achieve the objectives of detecting such events as a user sitting at a table and/or eating.

Figure 2:
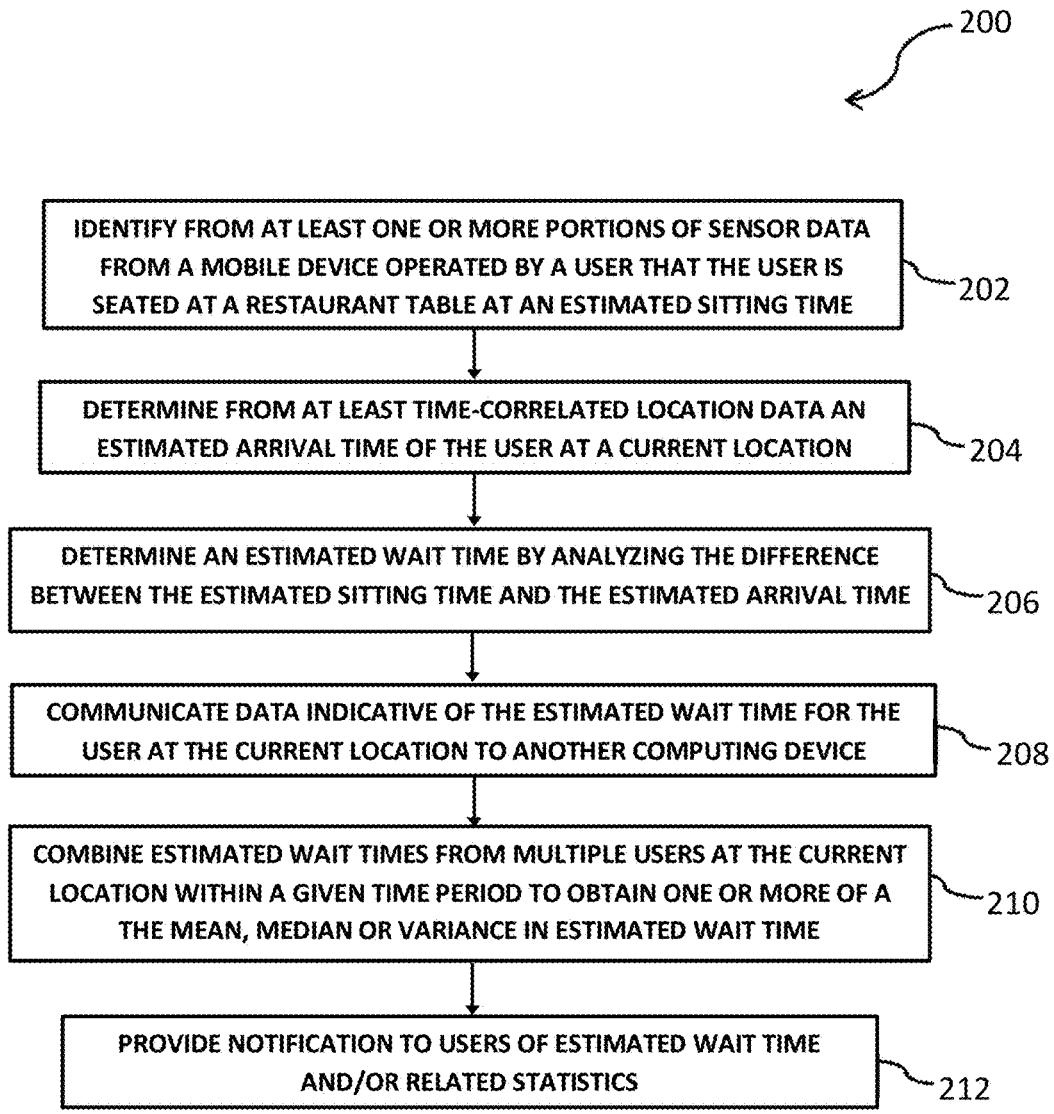
FIG. 2 provides a flow diagram of an example method of estimating restaurant wait time according to example aspects of the present disclosure.

Referring now to FIG. 2, an example method (200) of estimating restaurant wait time can include identifying (202) from at least one or more portions of sensor data from one or more mobile devices operated by a user that a user is seated at a restaurant table. Aspects of method (200) are described relative to a single user, although it should be appreciated that similar techniques can be applied to multiple users at a given table, multiple tables in a given restaurant, and/or multiple restaurants. The one or more portions of sensor data relevant to the identification in (202) can include sensor data such as obtained from the various wearable and non-wearable mobile computing devices shown in FIG. 1, including but not limited to data from motion sensors, orientation sensors, audio sensors, image sensors, glucometer sensors, and others. Additional details regarding the sensor data that can be used to identify (202) that a user is seated at a restaurant table is described relative to FIG. 3. The time at which a user is identified as likely being seated at a restaurant table is referred to as the estimated sitting time.

Referring still to FIG. 2, method (200) also can include determining (204) an estimated arrival time of a user at the current location (e.g., the particular restaurant the user is visiting). Mobile computing devices operated by a user, especially mobile devices such as 104, 114 of FIG. 1, typically include one or more location sensors that are capable of automatically determining a user's current geographic location and correlating that location to a specific location entity (e.g., restaurant or other place of business). Location data can be determined using a mobile computing device through such specific technologies as Global Positioning System (GPS), cell phone signal triangulation, wireless network identification and signal strength analysis, Bluetooth low energy (BLE) beacons, or other location determination technologies. Additionally or alternatively, the estimated arrival time determined at (204) can be deduced from sensor data, for example, by identifying the restaurant or the restaurant area in image data captured by various mobile computing devices, identifying a sound or audio pattern that is typical to a given restaurant in audio data captured by various mobile computing devices, etc. Sensor data, such as images and/or audio clips, can also include associated metadata including geotags and/or timestamps that can be used to help identify a particular establishment corresponding with the user's current location and/or arrival time.

Specific geographic coordinates (e.g., latitude/longitude or other geographic identifiers) can be gathered from the location data and compared to databases of known location entities to identify the specific current location of a user. In other words, location data analyzed in determination (204) can include a specific current geographic location including one or more of a latitude/longitude identifier, a street address identifier and/or a location entity identifier (e.g., the name of a restaurant or other business establishment). Known geographic coordinates and other location information associated with a user's home and/or work locations can also be helpful to distinguish between instances when a user is eating out at a restaurant versus eating at home when wait times might be less important or not require analysis.

Location data analyzed in determination (204) can be time-correlated in order to determine an estimated arrival time of the user at his current location. In many instances, time-correlated location data corresponds to location data analyzed over one or more time series. A user's location data history can be stored with correlating time stamps, and then can be analyzed in order to determine how long a user has been in a current location from an estimated arrival time until the present. In some examples, the detection of an event such as a user sitting at a restaurant table, being served food, or eating food at a restaurant can serve as a trigger to determine an estimated arrival time for the user at his/her current location. The trigger events cause location data sensors to analyze the user's location history to determine a current duration (e.g., x minutes) the user has been at his current location. Subtracting this current duration from the current time provides an estimate of the user's arrival time at the current location. In other examples, a timestamp associated with the location data identifying a user's arrival at his current location can be used to determine the estimated arrival time of the user at his current location.

Referring still to FIG. 2, an estimated wait time can be determined at (206) corresponding to the amount of time a user has waited after arriving at the restaurant until being seated at a table. In some examples, the estimated wait time determined at (206) can correspond to the time difference between estimated sitting time identified at (202) and estimated arrival time determined at (204). In other examples, the estimated arrival time determined at (206) can be determined more directly from the duration time between a trigger event (e.g., a user being seated at a restaurant table) and the deduced arrival time at the user's current location. Still further specific forms of time and location analysis can be used to estimate the user's arrival time and corresponding duration of time that the user has waited at his current location until being seated at a table.

Determining an estimated wait time at (206) can afford several advantages. One advantage can be recognized when the wait time is determined automatically from specifically identified activities, without requiring active participation from a user. It would be possible for users to manually indicate the occurrence of specific events, including the user's arrival time, sitting time, wait time and the like by manually entering data into a mobile computing device. Some electronic applications include opportunities for users to "check-in" to current locations and indicate related data such as wait times, etc. However, using sensor data and automated event detection analysis eliminates the need for active participation of a user to provide wait time information.

The wait time determined at (206) for a particular restaurant can be valuable information for other people associated with the restaurant, including current patrons waiting for a table, actual or potential future patrons interested in knowing the wait time, restaurant owners or other entities who may desire to track wait times for a restaurant, and others. As such, data indicative of the estimated wait time determined at (206) for a given user can be communicated at (208) to another computing device. Data indicative of the estimated wait time can include the actual estimated wait time, data used to calculate the estimated wait time, image and/or audio notifications indicative of estimated wait time or related information, and/or other relevant data. In some examples, the data indicative of estimated wait time can be communicated at (208) to one or more servers or other remote computing devices for centralized collection of wait time information, additional statistical analysis and/or other further processing. In other examples, the data indicative of estimated wait time can be communicated at (208) to other mobile computing devices operated by patrons that are subscribed to information pertaining to a particular location. For example, a user planning to visit Restaurant A during a current or future period of time can subscribe to receive information about the current wait times at Restaurant A and receive the estimated wait time data communicated at (208). In other examples, users don't receive this information until after additional statistical analysis conducted at (210).

Statistical analysis can be performed at (210) to combine estimated wait times from multiple users at a current location or given restaurant. For example, a remote computing device can gather restaurant wait times from multiple users at a particular restaurant and evaluate statistics of the wait times over a period of time (e.g., 10 minutes) by combining wait times for the different users. Example statistics can include but are not limited to a mean wait time, median wait time, variance in wait time, expected value of the wait time, and confidence interval of the wait time.

The statistics calculated at (210) relative to estimated wait times for various restaurants can be surfaced to other networked computing devices in a variety of different ways. For example, other computing devices operated by current, future, and/or potential patrons of a restaurant, owners/operators of a restaurant, or others can include programs, applications, internet access to websites, or other features for accessing wait time notifications and other wait time information. Notifications of estimated wait time statistics for different restaurants can be provided at (212) to networked computing devices operated by other users.

Notifications can provide wait time statistics and related information in a variety of meaningful ways. For example, some notification information provided at (212) might include the current wait time at a particular restaurant, while other information might indicate the typical wait time at a particular restaurant at a given time (e.g., 7:00 pm). Other information can be relayed in the form of alerts, such as a notification sent to interested users indicating when the estimated wait time at a given restaurant is below a particular threshold level (e.g., pop up when the wait time is below 15 minutes.) Notification information provided at (212) can be provided in the form of bar charts or other graphical representations that show estimated wait times over the course of different time periods (e.g., every hour, every half hour, every ten minutes, etc.) for different days of the week (e.g., Monday, Tuesday, Wednesday, Thursday, Friday, Saturday, Sunday) or subsets of days (e.g., weekdays, weeknights, weekend days, weekend nights, etc.). Still further forms of notifications and particular manners of communicating this information are within the scope of the present disclosure.

In some examples, notifications provided at (212) can be part of a specific application or program designed to provide wait time estimates for different restaurants and business establishments. In other examples, notifications provided at (212) can be part of a more general internet searching tool, such as Google Search offered by Google, Inc. When searching for a restaurant or other business using Google Search, additional details can be provided for the restaurant, including address, phone number, open hours, and popular times for that restaurant. Relevant data identified and/or determined in accordance with the present disclosure can help contribute to information identifying popular times for a restaurant or can help provide new information identifying estimated wait times and/or food serving times for a restaurant. Popular times, estimated wait times, and/or estimated food serving times for a given restaurant can be provided for display to a user in a variety of manners, such as in a bar chart form that can be scrolled through day by day for open hours of the restaurant.

Figure 3:
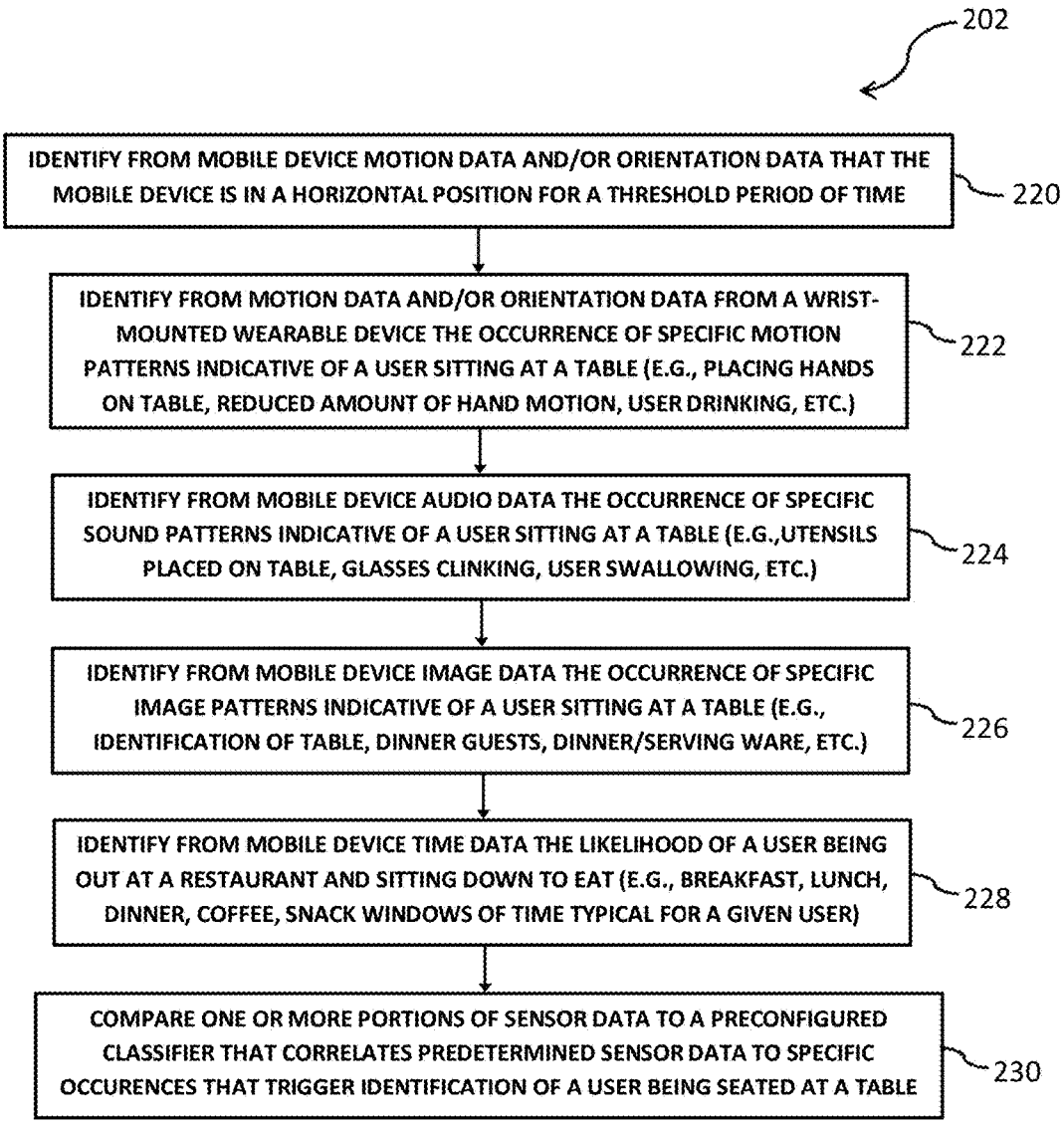
FIG. 3 provides a flow diagram of additional aspects related to identifying from one or more portions of sensor data that a user is seated at a restaurant table according to example aspects of the present disclosure.

Referring now to FIG. 3, additional aspects related to the identification of an estimated sitting time at (202) are depicted. Additional aspects (220)-(230), respectively, can be selectively incorporated into the identification at (202). Not all of the aspects need to be utilized in every example embodiment. In other embodiments, additional or alternative aspects to those depicted at (220)-(230) can be employed as part of identifying an estimated sitting time at (202).

In some examples of identifying an estimated sitting time at (202), motion data and/or orientation data from a mobile device can be analyzed to identify at (220) that the mobile device is in a horizontal position for a threshold period of time. Data analyzed at (220) could correspond to data obtained from motion/orientation sensors such as a compass, a gyroscope, an accelerometer, or the like provided within the mobile devices 104, 114 depicted in FIG. 1. This horizontal position data can be a meaningful indicator of a patron placing his/her phone or other mobile device on a restaurant table upon being seated.

Another example of identifying an estimated sitting time at (202) can analyze at (222) motion data and/or orientation data from a wrist-mounted wearable device. Sensor data obtained from a wrist-mounted wearable device can be analyzed to detect the occurrence of specific motion patterns indicative of a user sitting at a table (e.g., placing hands on the table, reduced hand movement relative to standing, drinking immediately upon or shortly after being seated at a table, etc.). Data analyzed at (222) could correspond to data obtained from motion/orientation sensors provided within wrist-mounted wearable devices such as activity tracker 106 and/or smart watch 116 depicted in FIG. 1.

Yet another example of identifying an estimated sitting time at (202) can analyze at (224) audio data from one or more audio sensors, e.g., audio sensors provided as part of a microphone in a mobile computing device. Sensor data obtained from audio sensors can help detect the occurrence of specific sound patterns (e.g., utensils being placed on a table, glasses clinking, user swallowing drinks, etc.). Audio sensors providing data analyzed at (224) can be obtained from a variety of devices, such as but not limited to optical head-mounted device 108, ear-mounted device 118, mobile devices 104, 114 from FIG. 1 and others.

A still further example of identifying an estimated sitting time at (202) can analyze at (226) image data from one or more image sensors, e.g., image sensors provided as part of a camera in a mobile computing device. Sensor data obtained from image sensors can help detect the occurrence of specific image patterns (e.g., identification of items such as a table, dinner/serving ware and/or meal guests, etc.). Image data analyzed at (226) can be obtained from a variety of devices, such as but not limited to optical head-mounted device 108, and/or mobile devices 104, 114 from FIG. 1 and others.

Another additional and/or alternative type of data that can be used as part of identifying an estimated sitting time at (202) can include time data. Time data can be used at (228) to help evaluate the likelihood of certain occurrences happening at a particular restaurant or for a particular user relative to typical windows of time for breakfast, lunch, dinner, coffee, snacks, etc. at the particular restaurant and for the particular user. For example, if image patterns are detected of a table positioned in front of the user near 7:00 pm, it might be helpful to weight such a detected image pattern with a higher score leaning towards determining that a user has been seated at a restaurant table during a time window typical for dinner. In other examples, it might be more likely that a specific user eats out for breakfast than for lunch or dinner. Specific settings or scoring preferences can be preconfigured and programmed in advance for different time windows for a given user in order to help obtained time data provide the most meaningful additional factors for analysis at (228).

Referring still to FIG. 3, an additional aspect of identifying an estimated sitting time at (202) involves the use of classifier training at (230). Although indicated as a final aspect (230) in the flow chart of FIG. 3, it should be appreciated that the classifier training at (230) can be done as an initial training step in identification (202) so that sensor data obtained and analyzed at (220)-(228) has a meaningful grid for analysis. In this manner, one or more portions of sensor data obtained and analyzed at (220)-(228) can be compared to a preconfigured classifier that correlates predetermined sensor data to specific occurrences that trigger identification of a user being seated at a table. In some examples of classifier training, machine learning can be used to evaluate obtained sensor data at (230). For example, time-correlated sensor data can become a feature for a training classifier using a learning algorithm such as Neural Network, Support Vector Machine (SVM) or other machine learning process. Classifiers can be trained to evaluate when a person is seated at a restaurant table. Then, in real time, the classifier runs on a user's mobile device and identifies subsequent instances of a user being seated at a restaurant by analyzing obtained sensor data in real time.

Figure 4:
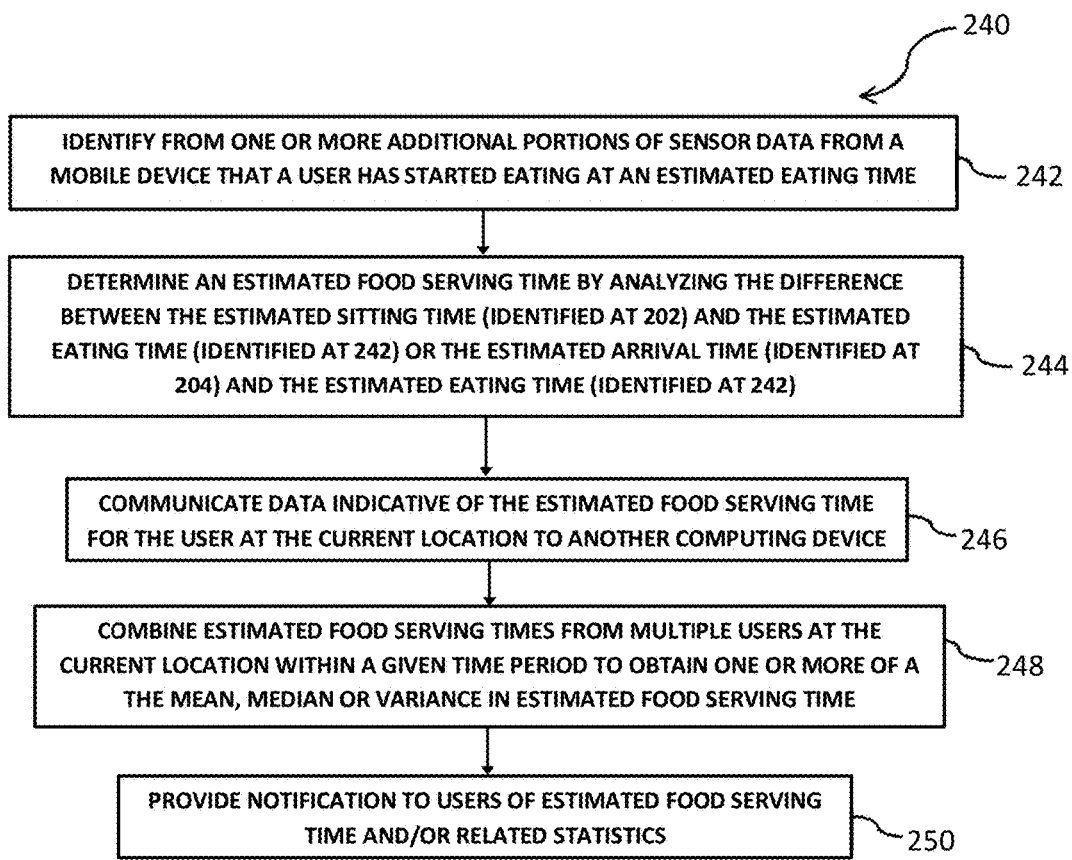
FIG. 4 provides a flow diagram of an example method of estimating food serving time according to example aspects of the present disclosure.
Figure 5:
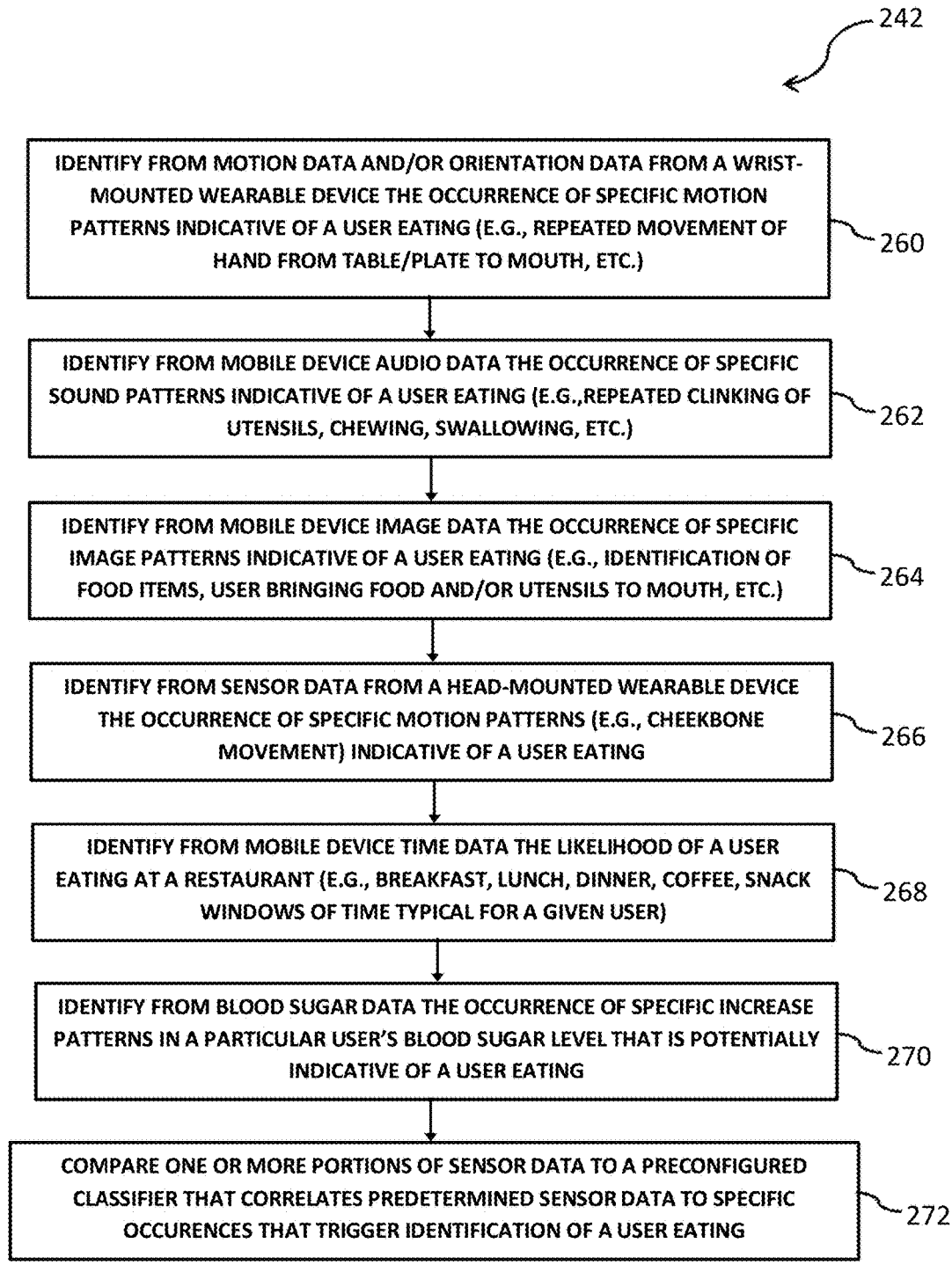
FIG. 5 provides a flow diagram of additional aspects related to identifying from one or more additional portions of sensor data that a user is eating according to example aspects of the present disclosure.

Referring now to FIGS. 4-5, an example method (240) of estimating food serving time and related aspects of this method are depicted. An estimated food serving time also can be considered a form of a wait time at a restaurant.

However, for sake of terminology, the "estimated wait time" described herein is used to refer to the typical wait time for a patron from arrival until being seated, while the "estimated food serving time" described herein is used to refer to the wait time until food is served at a restaurant. As will be appreciated from the present disclosure, a food serving time can be calculated relative to different durations of time (e.g., from an estimated arrival time at a restaurant and/or from an estimated sitting time at the restaurant.)

In FIG. 4, method (240) can include identifying (242) from at least one or more additional portions of sensor data from one or more mobile devices operated by a user that a user has started eating at a restaurant table. Aspects of method (240) are described relative to a single user, although it should be appreciated that similar techniques can be applied to multiple users at a given table, multiple tables in a given restaurant, and/or multiple restaurants. The one or more portions of additional sensor data relevant to the identification in (242) can include sensor data such as obtained from the various wearable and non-wearable mobile computing devices shown in FIG. 1, including but not limited to data from motion sensors, orientation sensors, audio sensors, image sensors, glucometer sensors, and others. Additional details regarding the sensor data that can be used to identify (242) that a user has started eating at a restaurant location is described relative to FIG. 5. The time at which a user can be identified as likely having started eating is referred to as the estimated eating time.

Referring still to FIG. 4, method (240) also can include determining (244) an estimated food serving time by analyzing the time difference between the estimated eating time identified at (242) and an initial time. In some examples, the initial time corresponds to the estimated sitting time identified at (202) for the particular user at the given restaurant, so that the estimated food serving time determined at (244) corresponds to the duration of time between the estimated sitting time identified at (202) and the estimated eating time identified at (242). In other examples, the initial time corresponds to the estimated arrival time identified at (204) for the particular user at the given restaurant, so that the estimated food serving time determined at (244) corresponds to the duration of time between the estimated arrival time identified at (204) and the estimated eating time identified at (242).

Determining an estimated food serving time at (244) can afford several advantages. One advantage can include that the food serving time is determined automatically from specifically identified activities, without requiring active participation from a user. It would be possible for users to manually indicate the occurrence of specific events, including the user's arrival time, sitting time, eating time, wait time and the like by manually entering data into a mobile computing device. Some electronic applications include opportunities for users to "check-in" to current locations and indicate related data such as food serving times, etc. However, using sensor data and automated event detection analysis can eliminate the need for active participation of a user to provide food serving time information.

The food serving time determined at (244) for a particular restaurant can be valuable information for other people associated with the restaurant, including current patrons waiting for a table, actual or potential future patrons interested in knowing the wait time, restaurant owners or other entities who may desire to track wait times for a restaurant, and others. As such, data indicative of the estimated food serving time determined at (244) for a given user can be communicated at (246) to another computing device. Data indicative of the estimated food serving time can include the actual estimated food serving time, data used to calculate the estimated food serving time, image and/or audio notifications indicative of estimated food serving time or related information, and/or other relevant data. In some examples, the data indicative of estimated food serving time can be communicated at (246) to one or more servers or other remote computing devices for centralized collection of food serving time information, additional statistical analysis and/or other further processing. In other examples, the data indicative of estimated food serving time can be communicated at (246) to other mobile computing devices operated by patrons that are subscribed to information pertaining to a particular location. For example, a user planning to visit Restaurant A during a current or future period of time can subscribe to receive information about the current food serving times at Restaurant A and receive the estimated food serving time data communicated at (246). In other examples, users don't receive this information until after additional statistical analysis conducted at (248).

Statistical analysis can be performed at (248) to combine estimated food serving times from multiple users at a current location or given restaurant. For example, a remote computing device can gather food serving times from multiple users at a particular restaurant and evaluate statistics of the food serving times over a period of time (e.g., 10 minutes) by combining food serving times for the different users. Example statistics can include but are not limited to a mean food serving time, median food serving time, variance in food serving time, expected value of the food serving time, and confidence interval of the food serving time.

The statistics calculated at (248) relative to estimated food serving times for various restaurants can be surfaced to other networked computing devices in a variety of different ways. For example, other computing devices operated by current, future, and/or potential patrons of a restaurant, owners/operators of a restaurant, or others can include programs, applications, internet access to websites, or other features for accessing food serving time notifications and other wait time information. Notifications of estimated food serving time statistics for different restaurants can be provided at (250) to networked computing devices operated by other users. Notifications can provide food serving time statistics and related information in a variety of meaningful ways. For example, some notification information provided at (250) might include the current food serving time at a particular restaurant, while other information might indicate the typical food serving time at a particular restaurant at a given time (e.g., 7:00 pm). Other information can be relayed in the form of alerts, such as a notification sent to interested users indicating when the estimated food serving time at a given restaurant is below a particular threshold level (e.g., pop up when the food serving time is below 15 minutes.) Still further forms of notifications and particular manners of communicating this information are within the scope of the present disclosure, and include combinations of notifications that provide both wait time information and food serving time information.

Referring now to FIG. 5, additional aspects related to the identification of an estimated eating time at (242) are depicted. Additional aspects (260)-(268), respectively, can be selectively incorporated into the identification at (242). Not all of the aspects need to be utilized in every embodiment. In other embodiments, additional or alternative aspects to those depicted at (260)-(268) can be employed as part of identifying an estimated eating time at (242).

In some examples of identifying an estimated eating time at (242), motion data and/or orientation data from a wrist-mounted wearable device can be analyzed at (260). Sensor data obtained from a wrist-mounted wearable device can be analyzed to detect the occurrence of specific motion patterns indicative of a user eating (e.g., repeated movement of hands together indicating combination use of multiple utensils to cut or maneuver food, repeated movement of hands from table/plate to mouth indicating a user bringing food to his mouth, etc.). Data analyzed at (260) could correspond to data obtained from motion/orientation sensors provided within wrist-mounted wearable devices such as activity tracker 106 and/or smart watch 116 depicted in FIG. 1.

Another example of identifying an estimated eating time at (242) can analyze at (262) audio data from one or more audio sensors, e.g., audio sensors provided as part of a microphone in a mobile computing device. Sensor data obtained from audio sensors can help detect the occurrence of specific sound patterns (e.g., repeated clinking of utensils, chewing, swallowing, etc.). Audio sensors providing data analyzed at (262) can be obtained from a variety of devices, such as but not limited to optical head-mounted device 108, ear-mounted device 118, mobile devices 104, 114 from FIG. 1 and others.

Yet another example of identifying an estimated eating time at (242) can analyze at (264) image data from one or more image sensors, e.g., image sensors provided as part of a camera in a mobile computing device. Sensor data obtained from image sensors can help detect the occurrence of specific image patterns (e.g., identification of items such as food placed on a table, user bringing food and/or utensils to his mouth, etc.). Image data analyzed at (264) can also include pictures that a user may take of his meal or other served item(s). Image metadata, including geotags and/or timestamps, etc., associated with captured image data also can be analyzed to help identify estimated eating time at (242) and location data analyzed in other aspects of the present disclosure. Image data providing data analyzed at (264) can be obtained from a variety of devices, such as but not limited to optical head-mounted device 108, and/or mobile devices 104, 114 from FIG. 1 and others.

A still further example of identifying an estimated eating time at (242) can analyze at (266) motion data from one or more motion sensors positioned relative to a user's head, face or mouth. Motion sensor data obtained from such motion sensors can be helpful to detect the occurrence of specific motion patterns such as cheekbone movement and/or cheek muscle movement indicative of a user eating. Motion sensor data analyzed at (266) can be obtained from a variety of devices, such as but not limited to ear-mounted device 118 from FIG. 1 and others.

Another additional and/or alternative type of data that can be used as part of identifying an estimated eating time at (242) can include time data. Time data can be used at (268) to help evaluate the likelihood of certain occurrences happening at a particular restaurant or for a particular user relative to typical windows of time for breakfast, lunch, dinner, coffee, snacks, etc. at the particular restaurant and for the particular user. For example, if image patterns are detected of food positioned in front of the user near 7:00 pm, it might be helpful to weight such a detected image pattern with a higher score leaning towards determining that a user has started eating at restaurant table during a time window typical for dinner. In other examples, it might be more likely that a specific user eats out for breakfast than for lunch or dinner. Specific settings or scoring preferences can be preconfigured and programmed in advance for different time windows for a given user in order to help obtained time data provide the most meaningful additional factors for analysis at (268).

A still further additional and/or alternative type of data that can be used as part of identifying an estimated eating time at (242) can include blood sugar data. Blood sugar data can be used at (270) to identify increasing levels of blood sugar that can be indicative of a user eating. Average blood sugar curve models or blood sugar curve models specific to a given user can be used as a basis of comparison to current blood sugar levels and identify increases that likely correspond to a user eating.

Referring still to FIG. 5, an additional aspect of identifying an estimated eating time at (242) involves the user of classifier training at (272). Although indicated as a final aspect (272) in the flow chart of FIG. 5, it should be appreciated that the classifier training at (272) can be done as an initial training step in identification (242) so that sensor data obtained and analyzed at (260)-(270) has a meaningful grid for analysis. In this manner, one or more portions of sensor data obtained and analyzed at (260)-(270) can be compared to a preconfigured classifier that correlates predetermined sensor data to specific occurrences that trigger identification of a user eating. In some examples of classifier training, machine learning can be used to evaluate obtained sensor data at (272). For example, time-correlated sensor data can become a feature for a training classifier using a learning algorithm such as Neural Network, Support Vector Machine (SVM) or other machine learning process. Classifiers can be trained to evaluate when a person is seated at a restaurant table. Then, in real time, the classifier runs on a user's mobile device and identifies subsequent instances of a user eating by analyzing obtained sensor data in real time.

Figure 6:
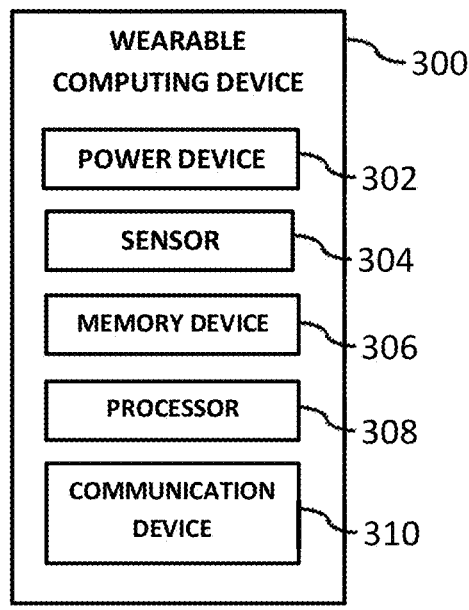
FIG. 6 provides an example overview of system components within a wearable computing device for implementing restaurant wait time and food service time estimation according to example aspects of the present disclosure.

Referring now to FIGS. 6-10, various examples of device and/or system components are depicted for implementing wait time and/or food service time estimation techniques. FIG. 6 provides an example overview of system components within a wearable computing device 300. Wearable computing device 300 can correspond to any of the wearable devices depicted in FIG. 1, including but not limited to activity tracker 106, smart watch 116, optical head-mounted display device 108, ear-mounted device 118, glucometer 120 and others.

Wearable computing device 300 can include at least one power device 302, at least one sensor 304, at least one memory device 306, at least one processor 308 and at least one communication device 310. Wearable computing devices 300 can differ in overall complexity, number of components, and type of components, so it should be appreciated that some wearable computing devices can contain more or less components than other wearable computing devices or different components. For example, when a wearable computing device corresponds to an optical head-mounted display 108 such as depicted in FIG. 1, it can include more sensors and related components than a glucometer 120.

Power device 302 can include any type of energy storage device such as a battery or capacitive device, which optionally can be rechargeable. In some examples, power device 302 can include a passive energy source such as one that is capable of rectifying energy received from an interrogating RF field or electromagnetic field in order to power the other circuitry within wearable computing device 200.

One or more sensors 304 also can be provided within wearable computing device 300. Although multiple sensors can be provided within some examples of a wearable computing device 300, other examples limit the number of sensors per wearable computing device. For example, sensors 304 included in an activity tracker 106 as depicted in FIG. 1 can include a motion sensor and/or an orientation sensor. Sensors 304 included in a smart watch 116 and/or optical head-mounted display 108 as depicted in FIG. 1 can include a motion sensor, an orientation sensor, an audio sensor and/or an image sensor. Sensors 304 included in ear-mounted device 118 as depicted in FIG. 1 can include a motion sensor and/or audio sensor. Sensors 304 included in glucometer 120 as depicted in FIG. 1 can include a blood sugar sensor. Additional sensors can be included and used in other embodiments.

Data captured by the one or more sensors 304 as well as other information within the wearable computing device 300 can be stored within one or more memory devices 306. The one or more memory devices 306 can include one or more computer-readable media, including, but not limited to, tangible, non-transitory, computer-readable media, RAM, ROM, hard drives, flash memory, or other memory devices. In some examples, memory devices 306 can correspond to coordinated databases that are split over multiple locations or mobile computing devices.

The one or more memory devices 306 can also store information accessible by the one or more processors 308 including instructions that can be executed by the one or more processors 308. The one or more processor(s) 308 can include any suitable processing device, such as a microprocessor, microcontroller, integrated circuit, logic device, one or more central processing units (CPUs) and/or other processing devices. The one or more memory devices 306 can also include data that can be retrieved, manipulated, created, or stored by the one or more processors 308.

Instructions and/or algorithms stored within the one or more memory devices 306 can help implement various computer-implemented methods. Instructions can also be stored within memory devices 306 that help implement smart operation of the one or more sensors 304 such that sensors only obtain data when a predetermined event is observed at the wearable computing device. For example, pictures can be obtained via one or more image sensors only when movement is detected near the wearable computing device.

Wearable computing device 300 also can include one or more communication devices 310 to facilitate communication from the wearable computing device 300 to another wearable computing device, a mobile computing device, a remote computing device, a home computing device associated with a particular user, or a network over which communication with such devices or other devices can occur. In some examples, communication device 310 can include a network interface used to communicate with other computing devices over a short range communications network via one or more communication technologies such as but not limited to Wi-Fi, Bluetooth, Zigbee, NFC or other electromagnetic induction technologies. In still further examples, communication device 210 can include a network interface for connecting to other types of communications networks such as a local area network (e.g. intranet), wide area network (e.g. Internet), cellular network, or some combination thereof. Such network interface(s) can include any suitable components for interfacing with one more networks, including for example, transmitters, receivers, ports, controllers, antennas, or other suitable components.

Although FIG. 6 illustrates one example of the types of electronic components that might be included within a wearable computing device 300, it should be appreciated that other examples might adapt an existing computing device to perform the desired functionality of a wearable computing device. For example, the memory within an existing computing device such as a mobile device, smartphone, tablet, laptop, wearable computing device or the like could be programmed with instructions that cause the existing computing device to perform computer-implemented methods for use with a wearable computing device.

Figure 7:
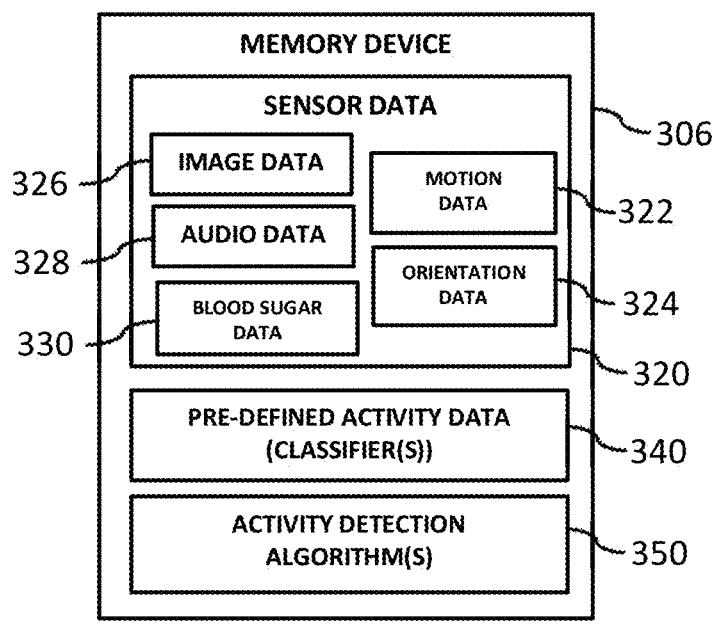
FIG. 7 provides an example overview of additional components stored within a memory device for identifying the occurrence of specific activities indicative of a user sitting at a table and/or eating according to example aspects of the present disclosure.

FIG. 7 depicts more specific aspects of data and executable instructions in the form of algorithms or other computer-executable steps that can be stored within memory device 306 of a wearable computing device 300. In some examples, sensor data 320 captured by the one or more sensors 304 of wearable computing device 300 can be stored in memory device 306. Depending on the type and configuration of the wearable computing device 300, sensor data 320 can include one or more specific types of data, including but not limited to motion data 322, orientation data 324, image data 326, audio data 328, and blood sugar data 330. Sensor data 320 can include data that can be relevant to a determination that a user is sitting at a table in a restaurant and/or eating in the restaurant environment.

Pre-defined activity data 340 and activity detection algorithm(s) 350 can also be stored within memory device 306. Pre-defined activity data can be collected as a labeled training set, or labeled sensor data, defining that a person is sitting or not sitting and/or eating or not eating, as measured from either a single user or multiple users. Pre-defined activity data 340 can also include one or more training classifiers using a process such as Neural Network (NN) or Support Vector Machine (SVM) learning techniques. The training classifiers can help define a data model indicative of specific event occurrences, such as a person sitting or not sitting at a table and/or eating or not eating. Activity detection algorithm(s) 350 can process sensor data 306 obtained by sensors 304 in one or more wearable computing devices. For example, activity detection algorithm 350 can generate at least one computer-generated indication that a user sitting at a table and/or eating based on data obtained by sensors 304 and compared with at least the pre-defined activity data 340. In some examples, activity detection algorithm(s) 350 include the computer-executable instructions that implement the identification at (202) of FIG. 2 that a user is seated at a restaurant table, and as described more particularly in the aspects of FIG. 3. In some examples, activity detection algorithm(s) 350 also include the computer-executable instructions that implement the identification at (242) of FIG. 4 that a user is eating, and as described more particularly in the aspects of FIG. 5.

A specific example of the interaction among sensor data 320, pre-defined activity data 340 and activity detection algorithm 350 corresponds to monitoring a user's blood sugar data to help determine if the user is eating. For example, if wearable computing device 300 is a glucometer, sensors 304 can obtain blood sugar data 330 indicating the current levels of a user's blood sugar. Activity detection algorithm 350 can compare a user's current blood sugar data 330 to a pre-defined activity data 340, including data defining the typical blood sugar level increase indicating that the particular user is eating. Activity detection algorithm 350 can then communicate a detected occurrence of a user's blood sugar level increase to another computing device using communication device 310.

Although sensor data 320, pre-defined activity data 340, and activity detection algorithms 350 are shown as included in memory device 306 associated with wearable computing device 300, this data and instructions can additionally or alternatively be included on another wearable computing device or non-wearable mobile computing device associated with a given user, on a remote computing device, and/or distributed on multiple computing devices, such as a local computing device and a remote computing device.

Figure 8:
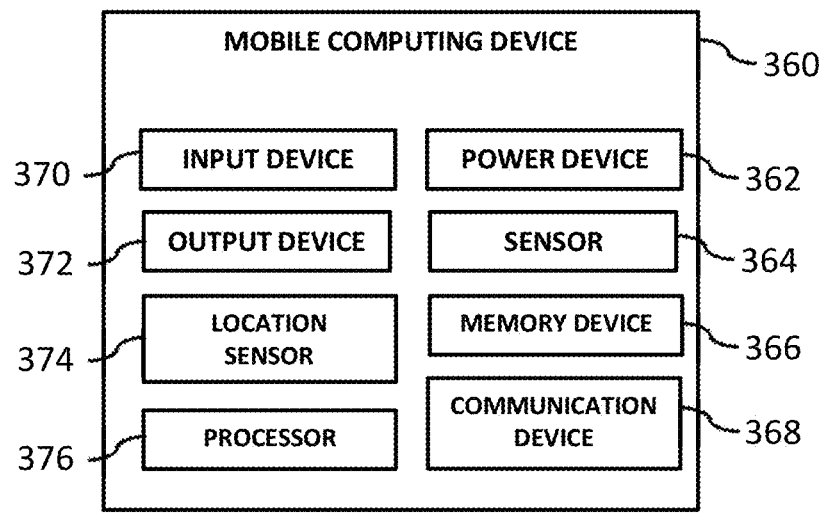
FIG. 8 provides an example overview of system components within a mobile computing device for implementing restaurant wait time and food service time estimation according to example aspects of the present disclosure.
Figure 9:
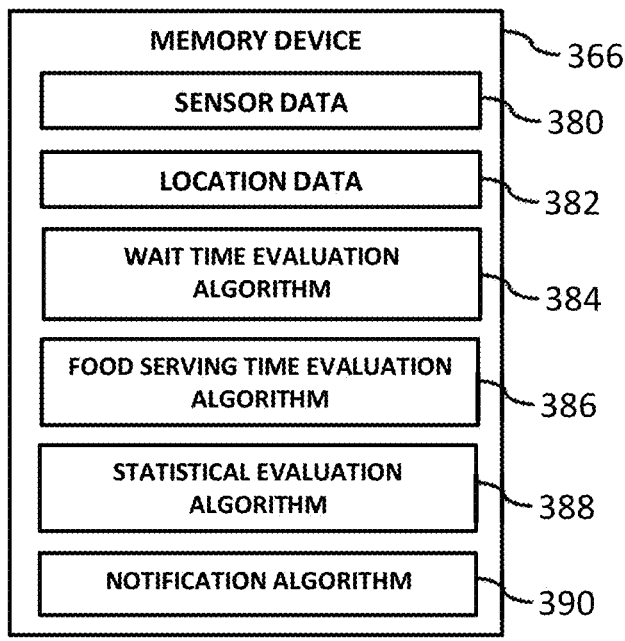
FIG. 9 provides an example overview of additional components stored within a memory device for implementing restaurant wait time and food service time estimation according to example aspects of the present disclosure.

FIGS. 8-9 are similar in many respects to FIGS. 6-7, but are intended to depict device or system components within a non-wearable mobile computing device as opposed to a wearable computing device for implementing restaurant wait time and food service time estimation. A mobile computing device 360 depicted in FIG. 8 can correspond to a non-wearable mobile device such as smartphones 104, 114 depicted in FIG. 1. Some examples of mobile computing devices 360 can include more components than a wearable computing device 300 because there are fewer device size, location and functionality constraints in a non-wearable device.

In some examples, components included within mobile computing device 360 are similar to components included within wearable computing device 300. For instance, power device 362 of mobile computing device 360 can be equated with power device 302 of wearable computing device 300. One or more sensors 364 of mobile computing device 360 can be equated with sensors 304 of wearable computing device 300. One or more memory devices 366 of mobile computing device 360 can be equated with the one or more memory devices 306 of wearable computing device 300. One or more processors 376 of mobile computing device 360 can be equated with the one or more processors 308 of wearable computing device 300. One or more communication devices 368 of mobile computing device 360 can be equated within the one or more communication devices 310 of wearable computing device 300. As such, description corresponding to such components depicted in FIG. 6 equally applies to the similar components depicted in FIG. 8.

In some examples, mobile computing device 360 can include still further components, such as but not limited to one or more input devices 370, one or more output devices 372, and one or more location sensors 374. An input device 370 can include devices such as a touch screen, touch pad, data entry keys, and/or a microphone suitable for voice recognition. An output device 372 can include audio or visual outputs such as speakers for providing audio output, displays for providing graphical user interfaces or other visual messages or communications, lights for providing flashing indicators, or devices for providing somatosensory and/or haptic responses, etc. Location sensors 374 can include a GPS device, BLE beacon detector, or other device or combination of devices and instructions that can determine a user's current location in order to identify the arrival time and/or particular restaurant associated with the current geographic location of a user.

FIG. 9 depicts more specific aspects of data and executable instructions in the form of algorithms or other computer-executable steps that can be stored within memory device 366 of a mobile computing device 360. In some examples, sensor data 380 captured by the one or more sensors 364 of mobile computing device 360 and/or by the one or more sensors 304 of wearable computing device 300 can be stored in memory device 366. Similar to sensor data 320, sensor data 380 can include one or more specific types of data, including but not limited to motion data, orientation data, image data, audio data, time data and blood sugar data. Sensor data 380 can include time data that can be relevant to a determination that a user is sitting at a table in a restaurant and/or eating in the restaurant environment. Location data 382 corresponds to current location information determined by location sensor 374 and/or related to the time-correlated location data used at (204) to determine an estimated arrival time at a user's current location.

Memory device 366 can also include various sets of computer-executable instructions stored as algorithms 384-390, respectively, including waiting time evaluation algorithm 384, food serving time evaluation algorithm 386, statistical evaluation algorithm 388 and notification algorithm 390. In some examples, wait time evaluation algorithm 384 can include computer-executable instructions that implement the identification (202) of estimated sitting time, determination (204) of estimated arrival time, determination (206) of estimated wait time, and communication (208) of estimated wait time to another computing device from FIG. 2. In some examples, food serving time evaluation algorithm 386 can include computer-executable instructions that implement the identification (242) of estimated eating time, determination (244) of estimated food serving time, and communication (246) of estimated food serving time to another computing device from FIG. 4. In some examples, statistical evaluation algorithm 388 can include computer-executable instructions that implement the combination of estimated wait times at (210) in FIG. 2 and/or the combination of estimated food serving times at (250) in FIG. 4. In some examples, the notification algorithm(s) 390 can include computer-executable instructions that implement the providing of notifications at (212) in FIG. 2 or at (252) in FIG. 4.

Figure 10:
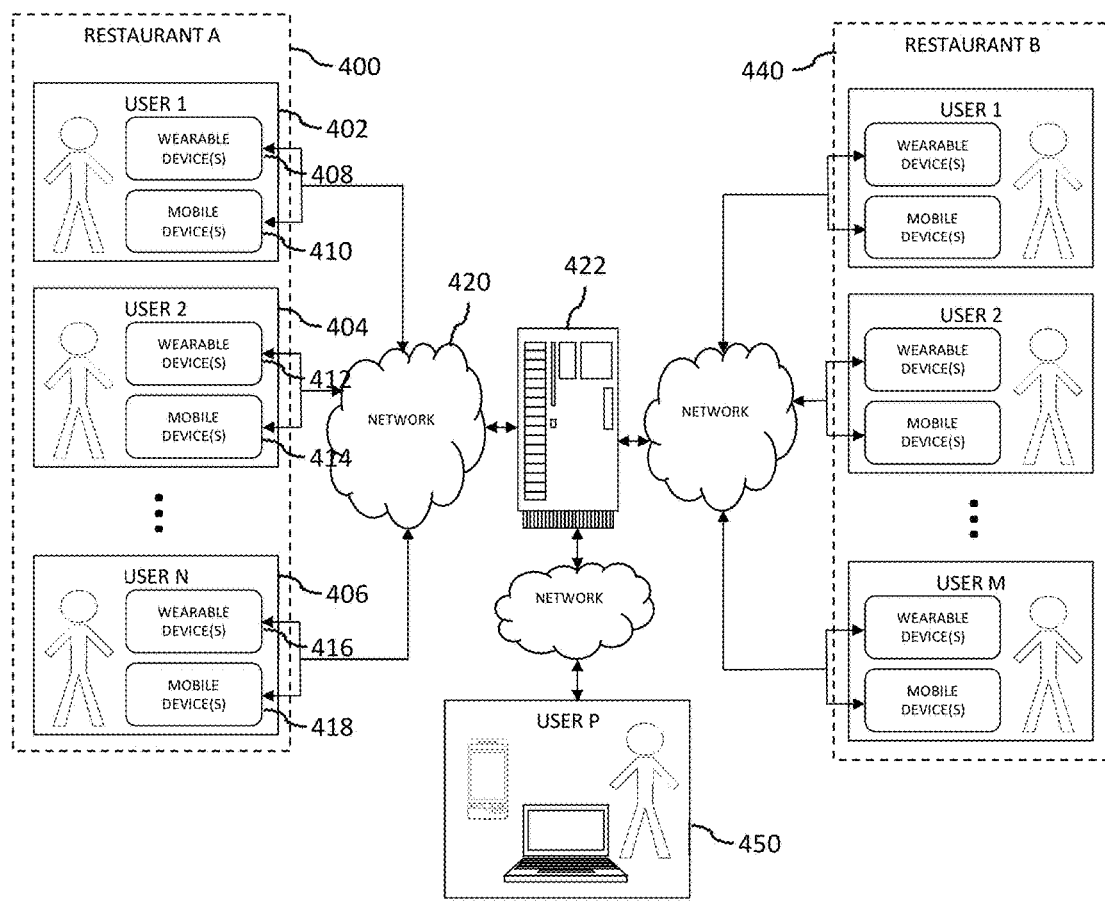
FIG. 10 provides an example overview of system components for networked determination and communication of restaurant wait time and food serving time information according to example aspects of the present disclosure.

FIG. 10 provides an example overview of system components for networked determination and communication of restaurant wait time and food serving time information as implemented for multiple restaurants. FIG. 10 depicts components provided for wait time estimation at Restaurant A 400 and Restaurant B 440. Although two different restaurants 400, 440 are illustrated in FIG. 10, example embodiments can be implemented for a much greater number of restaurants at many different locations throughout a given area, a given country, or the world.

At Restaurant A, a number (N) of different users collectively provide relevant sensor data that can be used to estimate wait time and/or food serving time at Restaurant A. User 1 402, User 2 404, up to User N 406 each can operate a number of respective client devices. For example, User 1 402 can be provided with one or more wearable computing devices 408 and/or non-wearable mobile computing devices 410, while User 2 404 can be provided with one or more wearable computing devices 412 and/or non-wearable mobile computing devices 414, and User N 406 can be provided with one or more wearable computing devices 416 and/or non-wearable mobile computing devices 418.

In some examples, one or more of the client devices for each respective user 1, 2, . . . , N in Restaurant A captures relevant sensor data and makes a determination of an estimated wait time and/or food serving time. The determined wait time and/or food serving time then can be communicated from each user 1, 2, . . . , N over network 420 to a remote computing device 422. Network 420 can include any number of networks, including but not limited to a local area network (e.g. intranet), wide area network (e.g. Internet), cellular network, or some combination thereof. Remote computing device 422 can correspond to a centralized database or server computing device. In some examples, the remote computing device 422 can implement the statistical evaluation of estimated wait times and/or estimated food serving times across multiple users 1, 2, . . . , N at Restaurant A to obtain such statistics as mean, median, variance, expected value and/or confidence interval of the different determined times. In other examples, the remote computing device 422 can gather basic sensor and location data from the different wearable computing devices 408, 412, 416 and non-wearable computing devices 410, 414, 418 and determine the estimated wait times and/or food serving times at the remote computing device 422 as opposed to at the client devices operated by Users 1, 2, . . . , N.

A similar breakout of sensor data collection and estimation of wait times and/or food serving times can be implemented relative to Users 1, 2, . . . , M at Restaurant B. As such, the description of components from Restaurant A 400 can apply to similar components depicted in Restaurant B 440.

Once estimated wait times and/or food serving times are determined by and/or communicated to remote computing device 422, it is possible to share such valuable information with still further users. In some examples, estimated wait time and/or estimated food serving time statistics or related information from User 1 402 at Restaurant A 400 can be shared with other current users (e.g., User 2 404 or User N 406) at Restaurant A 400. In other examples, estimated wait time and/or estimated food serving time statistics or related information from single users 402, 404, 406 or time statistics combined across multiple users at remote computing device 422 can be communicated to a separate User P 450. User P does not necessarily have to be located at Restaurant A 400 or Restaurant B 440, but can be interested in obtaining information about the estimated wait times and/or food serving times at one or more of the restaurants. User P 450 can access this information from a mobile device or personal computing device, and can correspond to a potential patron of a restaurant, an owner of a restaurant, or other interested party.

Figure 11:
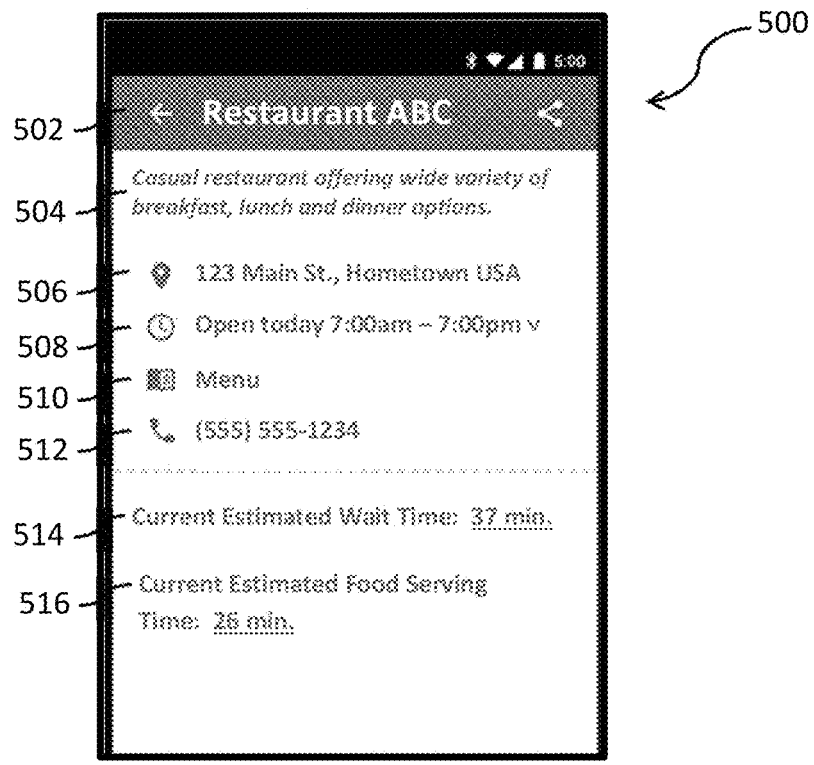
FIG. 11 provides an example user interface including notifications for communicating estimated wait time and/or food service time information for a restaurant according to example aspects of the present disclosure.
Figure 12:
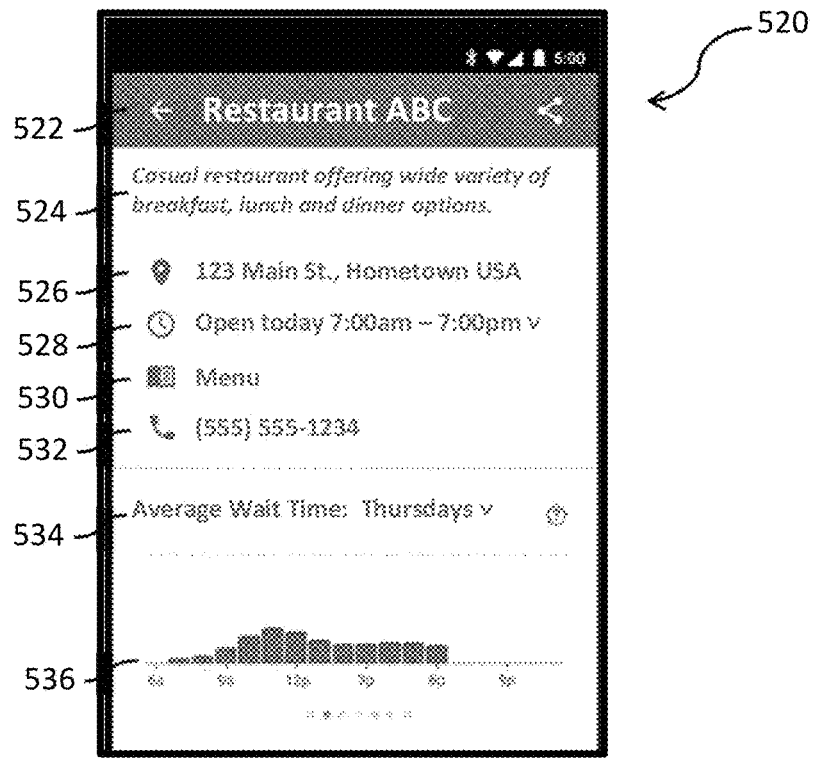
FIG. 12 provides another example user interface including notifications for communicating estimated wait time and/or food service time information for a restaurant according to example aspects of the present disclosure.

Referring now to FIGS. 11-12, examples of user interfaces are depicted for providing notifications of estimated wait times and/or food service times and related information for a restaurant. The example user interfaces of FIGS. 11 and 12 can be used to provide notifications at (212) and/or (250) as described with reference to FIGS. 2 and 4, respectively. Different types of notifications with additional or alternative forms of integrated restaurant and/or wait time information also can be used in accordance with the present disclosure.

FIG. 11 depicts an example user interface 500 that can provide detailed information about a given restaurant, including notifications identifying the current estimated wait time and current estimated food serving time for that restaurant. User interface portion 502 can include a text identifier of the name of a given restaurant (e.g., Restaurant ABC), while user interface portion 504 can include a text description of the given restaurant. Additional general information for Restaurant ABC can be provided in user interface 500. User interface portion 506 can include a text block identifying the street address for the given restaurant as well as a selectable hyperlink by which a user can obtain navigation directions to the given restaurant. User interface portion 508 can include the current hours for the given restaurant. A scroll-down arrow provided within user interface portion 508 can enable a user to select a different day of the week (e.g., other than the current day) for identifying restaurant hours. User interface portion 510 can include a selectable hyperlink to a menu for the given restaurant. User interface portion 512 can include a phone number for the given restaurant, which can be linked to an integrated calling application within a smartphone or other computing device. User interface portion 514 can provide an alphanumeric identification of the current estimated wait time for the given restaurant, while user interface portion 516 can include an alphanumeric identification of the current estimated food serving time for the given restaurant.

FIG. 12 depicts an example user interface 520 that can provide detailed information about a given restaurant, including the average wait times over varied time intervals and days for that restaurant. User interface portion 522 can include a text identifier of the name of a given restaurant (e.g., Restaurant ABC), while user interface portion 524 can include a text description of the given restaurant. Additional general information for Restaurant ABC can be provided in user interface 520. User interface portion 526 can include a text block identifying the street address for the given restaurant as well as a selectable hyperlink by which a user can obtain navigation directions to the given restaurant. User interface portion 528 can include the current hours for the given restaurant. A scroll-down arrow provided within user interface portion 528 can enable a user to select a different day of the week (e.g., other than the current day) for identifying restaurant hours. User interface portion 530 can include a selectable hyperlink to a menu for the given restaurant. User interface portion 532 can include a phone number for the given restaurant, which can be linked to an integrated calling application within a smartphone or other computing device. User interface portion 534 can provide a selectable scroll-down menu by which a user may select a specific day of the week (e.g., Thursdays) for identifying average wait times for the given restaurant. A scroll-down menu can also be provided in user interface portion 534 by which a user may select the type of estimated wait time for which he would like information (e.g., estimated wait time until being seated, estimated wait time until food is served, etc.). User interface portion 536 can include a bar chart with average wait time information identified in different hour-long intervals throughout the open hours of the restaurant for the selected day of the week. The bar chart provided in user interface portion 536 can be additionally or alternatively depicted across different time intervals. For example, a user can choose to view average wait times calculated in ten, fifteen, or thirty minute intervals or other interval options. In some examples, user interface portion 536 can be configured such that a user can swipe a touchscreen or select arrows to the left or right to view average wait times for a different day of the week, with the possibility of scrolling through seven days or the total number of days that the given restaurant is open.

It will be appreciated that the computer-executable algorithms described herein can be implemented in hardware, application specific circuits, firmware and/or software controlling a general purpose processor. In one embodiment, the algorithms are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the algorithm.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of monitoring activity at a location such as a restaurant, for estimating at least one or more different wait times at the location, comprising:
    identifying, by one or more computing devices, from at least one or more portions of sensor data from one or more mobile devices operated by a user that the user is seated at a restaurant table at an estimated sitting time, wherein the one or more portions of sensor data comprise motion sensor data, wherein the one or more mobile devices operated by the user comprise a wearable device, and wherein identifying that the user is seated at a restaurant table comprises identifying the occurrence of specific motion patterns from the one or more portions of motion sensor data, the specific motion patterns comprising one or more of the user placing his hands on the table, a reduced amount of hand motion of the user, or the user drinking;
    identifying, by the one or more computing devices, from at least time-correlated location data from the one or more mobile devices operated by the user an estimated arrival time of the user at the current location;
    wherein said one or more computing devices includes a machine learning classifier for defining a data model, the method further comprising:
        training the machine learning classifier to define a data model indicative of one or more event occurrences for the one or more different wait times, said training including:
            determining, by the one or more computing devices, an estimated first wait time by analyzing the difference between the estimated sitting time and the estimated arrival time; and
            determining, by the one or more computing devices, if one or more events has occurred to trigger the start of respective one or more wait times that are different than the first wait time, and if so estimating at least one different wait time based on the start time of respective one or more event occurrences; and
        applying the defined data model obtained from the machine learning classifier to automatically identify subsequent instances of said one or more event occurrences by providing the one or more portions of sensor data comprising the motion sensor data as input to the data defined model; and
    communicating, by the one or more computing devices, data indicative of the estimated first and at least one different wait time for the user at the current location to another computing device.

2. The computer-implemented method of claim 1, wherein the one or more portions of sensor data comprise mobile device orientation data, and wherein identifying that the user is seated at a restaurant table comprises identifying from the mobile device orientation data that the mobile device is in a horizontal position for a threshold period of time.

3. The computer-implemented method of claim 1, wherein the one or more portions of sensor data comprise orientation data from the wearable device configured for functional operation on a user's wrist.

4. The computer-implemented method of claim 1, wherein the one or more portions of sensor data comprise mobile device audio data, and wherein identifying that the user is seated at a restaurant table comprises identifying the occurrence of specific sound patterns from the one or more portions of sensor data.

5. The computer-implemented method of claim 1, wherein the one or more portions of sensor data comprise mobile device image data, and wherein identifying that the user is seated at a restaurant table comprises identifying the occurrence of specific image patterns from the one or more portions of sensor data.

6. The computer-implemented method of claim 1, wherein the one or more portions of sensor data comprise time data, and wherein identifying that the user is seated at a restaurant table comprises analyzing the likelihood that a user would be sitting at a table to eat during one or more specific windows of time.

7. The computer-implemented method of claim 1, wherein identifying from the one or more portions of sensor data that a user is seated at a restaurant table comprises comparing the one or more portions of sensor data to a preconfigured classifier that correlates predetermined sensor data to specific occurrences that trigger identification of a user being seated at a restaurant table.

8. The computer-implemented method of claim 1, further comprising combining multiple estimated wait times from multiple users at the current location within a given period of time to obtain one or more of a median estimated wait time, mean estimated wait time, variance in estimated wait time, expected value of the estimated wait time, or confidence interval of the estimated wait time at the current location.

9. The computer-implemented method of claim 1, wherein estimating at least one different wait time comprises estimating a food serving time, and wherein the one or more event occurrences comprise identifying the start of an estimated eating time.

10. The computer-implemented method of claim 9, wherein the one or more additional portions of sensor data comprise one or more of motion data or orientation data from the wearable device configured for functional operation on a user's wrist, and wherein identifying that a user is eating comprises identifying the occurrence of the specific motion patterns from the one or more additional portions of sensor data.

11. The computer-implemented method of claim 9, wherein the one or more additional portions of sensor data comprise one or more of mobile device audio data or mobile device image data, and wherein identifying that a user is eating comprises identifying the occurrence of one or more of specific sound patterns or specific image patterns from the one or more additional portions of sensor data.

12. The computer-implemented method of claim 10, wherein one or more of the estimated arrival time, estimated sitting time or estimated eating time are deduced from timestamps within metadata associated with one or more of the mobile device audio data or mobile device image data.

13. The computer-implemented method of claim 9, wherein the one or more additional portions of sensor data comprise wearable device data from the wearable device configured for functional operation by a user's ear, and wherein identifying that a user has started eating comprises analyzing cheek motion indicated by the wearable device data.

14. The computer-implemented method of claim 9, wherein the one or more additional portions of sensor data comprise blood sugar monitor data, and wherein identifying that a user is eating comprises detecting a rise in blood sugar levels of the user.

15. A system, comprising:
one or more processors; and
one or more memory devices, the one or more memory devices storing a machine learning classifier for defining a data model and computer-readable instructions that when executed by the one or more processors, cause the one or more processors to perform operations, the operations comprising:
identifying from at least one or more portions of sensor data from one or more mobile devices operated by a user that the user is seated at a restaurant table at an estimated sitting time, wherein the one or more portions of sensor data comprise motion sensor data, wherein the one or more mobile devices operated by the user comprise a wearable device, and wherein identifying that the user is seated at a restaurant table comprises identifying the occurrence of specific motion patterns from the one or more portions of motion sensor data, the specific motion patterns comprising one or more of the user placing his hands on the table, a reduced amount of hand motion of the user, or the user drinking;
identifying from at least time-correlated location data from the one or more mobile devices operated by the user an estimated arrival time of the user at the current location;
training the machine learning classifier to define a data model indicative of one or more event occurrences for the one or more different wait times, said training including:
determining an estimated first wait time by analyzing the difference between the estimated sitting time and the estimated arrival time; and
determining if one or more events has occurred to trigger the start of respective one or more wait times that are different than the first wait time, and if so estimating at least one different wait time based on the start time of respective one or more event occurrences;
applying the defined data model obtained from the machine learning classifier to automatically identify subsequent instances of said one or more event occurrences by providing the one or more portions of sensor data comprising the motion sensor data as input to the data defined model; and
communicating, by the one or more computing devices, data indicative of the estimated first and at least one different wait time for the user at the current location to another computing device.

16. The system of claim 15, wherein estimating at least one different wait time comprises estimating a food serving time, and wherein the one or more event occurrences comprise identifying the start of an estimated eating time.

17. The system of claim 16, wherein the operations further comprise:
providing for display a notification that provides information identifying the estimated food serving time at the current location of the user.

18. The system of claim 15, wherein the one or more portions of sensor data comprise one or more of motion data, orientation data, sound data, image data, blood sugar data, or time data.

19. The system of claim 15, wherein the notification provides a graphical representation of the estimated wait time at the current location over different time intervals for different days of the week.

* * * * *